United States Patent
Gustavsson et al.

(10) Patent No.: US 9,762,875 B2
(45) Date of Patent: Sep. 12, 2017

(54) METHODS AND DEVICES FOR PARALLAX ELIMINATION

(71) Applicant: Sony Corporation, Tokyo (JP)

(72) Inventors: Jonas Gustavsson, Lund (SE); Mats Wernersson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 241 days.

(21) Appl. No.: 13/961,982

(22) Filed: Aug. 8, 2013

(65) Prior Publication Data

US 2014/0368681 A1 Dec. 18, 2014

Related U.S. Application Data

(60) Provisional application No. 61/835,035, filed on Jun. 14, 2013.

(51) Int. Cl.
| | | |
|---|---|---|
| *H04N 5/225* | (2006.01) | |
| *G06K 9/62* | (2006.01) | |
| *H04N 9/64* | (2006.01) | |
| *G06F 3/041* | (2006.01) | |
| *H04N 3/14* | (2006.01) | |
| *H04N 5/341* | (2011.01) | |
| *H04N 5/232* | (2006.01) | |

(52) U.S. Cl.
CPC .......... *H04N 9/646* (2013.01); *G06F 3/0418* (2013.01); *H04N 3/1593* (2013.01); *H04N 5/23229* (2013.01); *H04N 5/3415* (2013.01)

(58) Field of Classification Search
CPC .... H04N 9/045; H04N 5/23229; H04N 5/367; H04N 5/142; H04N 5/357; H04N 5/365; H04N 9/64; H04N 19/86; H04N 1/60; H04N 9/646; G06K 9/0061; G06K 15/1872; G06K 9/40; G06K 9/4652; G06T 2207/10024; G06T 3/4015; G06T 7/408; G06T 5/002; G06T 11/001
See application file for complete search history.

(56) References Cited

U.S. PATENT DOCUMENTS

| | | | | |
|---|---|---|---|---|
| 8,619,082 | B1 * | 12/2013 | Ciurea | G06T 7/593 |
| | | | | 345/427 |
| 2006/0251322 | A1 * | 11/2006 | Palum | H04N 9/646 |
| | | | | 382/167 |

FOREIGN PATENT DOCUMENTS

| | | |
|---|---|---|
| EP | 2 466 871 A2 | 6/2012 |
| WO | WO 2005/018221 A1 | 2/2005 |
| WO | WO 2009/025959 A1 | 2/2009 |

OTHER PUBLICATIONS

European Search Report Corresponding to European Patent Application No. 14167505.8; Dated: Nov. 27, 2014; 7 Pages.

* cited by examiner

*Primary Examiner* — Twyler Haskins
*Assistant Examiner* — Carramah J Quiett
(74) *Attorney, Agent, or Firm* — Myers Bigel, P.A.

(57) ABSTRACT

Devices and methods for reducing parallax in graphic content captured by a camera array include identifying color fringes that correspond to the parallax in the captured graphic content, determining an amount of displacement of the color fringes and adjusting the parallax in the captured graphic content based on the amount of displacement. The camera array may comprise a two-dimensional array of cameras.

20 Claims, 4 Drawing Sheets

METHODS AND DEVICES FOR PARALLAX ELIMINATION

CROSS-REFERENCE TO RELATED APPLICATIONS

This application claims the benefit of and priority to U.S. Provisional Patent Application No. 61/835,035, filed on Jun. 14, 2013, the entire contents of which are hereby incorporated by reference.

FIELD OF THE INVENTION

The present invention relates to image processing and, more particularly, to mobile terminals including cameras and related methods, devices and computer program products.

BACKGROUND

Array cameras may have many advantages. A configuration of 2×2 cameras may for instance provide a lower building height than a traditional single camera having similar resolution performance. One configuration of an array camera may, for instance, include two cameras having green (G) filters, one camera having a blue (B) filter and another having a red (R) filter. As the cameras are positioned in an array or matrix, they will produce images from slightly different viewpoints. When the four images from the four cameras are combined to an RGB image, a parallax effect can result in color mismatch.

One way of addressing the parallax problem is to apply a correlation (or disparity) algorithm where the images are compared and adjusted for the parallax errors. Such algorithms are usually very demanding on computational power, especially for mobile devices. There may also some difficulties in obtaining a sufficient estimation of the parallax over the entire image. Video recording can be especially difficult, in light of the amount of data to process.

SUMMARY

An electronic device for reducing parallax in graphic content captured by a camera array according to some embodiments includes a processor and a memory coupled to the processor and comprising computer readable program code embodied in the memory that when executed by the processor causes the processor to perform operations comprising: identifying color fringes, perhaps in a visual data signal, that correspond to the parallax in the captured graphic content, determining an amount of displacement of the color fringes and adjusting the parallax in the captured graphic content based on the amount of displacement from a reference image. The reference image, or expected image, may be based on a viewpoint of a master camera of the camera array. The camera array may comprise a two-dimensional array of cameras. Graphic content may include an image or a frame of video.

In further embodiments, the identifying, determining and adjusting may be performed on ones of localized areas of the captured graphic content. Identifying color fringes may comprise detecting a color space that is abnormal relative to an expected or reference color space for an area of the captured graphic content.

In some embodiments, the determining may comprise determining the amount of displacement based on an average of a displacement at a closest distance of an object to the camera array and a displacement at an infinite distance of an object from the camera array.

In some embodiments, the adjusting is performed relative to a graphic content perspective of a camera of the camera array. The adjusting may be performed relative to a graphic content perspective of a luminance camera. The adjusting may comprise displacing a respective portion of the captured graphic content affected by the parallax by the amount of displacement.

According to some embodiments, a wireless terminal comprises a camera array configured to generate a visual data signal that corresponds to captured graphic content and a signal processor. The signal process may be configured to identify color fringes in the visual data signal that correspond to parallax in the captured graphic content, determine an amount of displacement of the color fringes and adjust the parallax in the graphic content based on the amount of displacement.

In some embodiments, the signal processor may be further configured to adjust the parallax on ones of localized areas of the captured graphic content.

In further embodiments, the signal processor may be further configured to detect a color space that is abnormal relative to an expected color space for an area of the captured graphic content.

In some embodiments, the signal processor may be further configured to adjust the parallax relative to a graphic content perspective of a camera of the camera array. The signal processor may be further configured to adjust the parallax relative to a graphic content perspective of a luminance camera.

In further embodiments, the signal processor may be further configured to displace a respective portion of the captured graphic content affected by the parallax by the amount of displacement.

In some embodiments, the signal processor may be further configured to determine an amount of displacement based on an average of a displacement at a closest distance of an object to the camera array and a displacement at an infinite distance of an object from the camera array.

According to some embodiments, a method for reducing parallax in graphic content captured by a camera array comprises identifying color fringes in a visual data signal that correspond to the parallax in the captured graphic content, determining an amount of displacement of the color fringes and adjusting the parallax in the captured graphic content based on the amount of displacement.

In further embodiments, the identifying, determining and adjusting may be performed on ones of localized areas of the captured graphic content. Identifying color fringes may comprise detecting a color space that is abnormal relative to an expected color space for an area of the captured graphic content.

In some embodiments, the determining may comprise determining an amount of displacement based on an average of a displacement at a closest distance of an object to the camera array and a displacement at an infinite distance of an object from the camera array.

In some embodiments, the adjusting is performed relative to a graphic content perspective of a camera of the camera array. The adjusting may be performed relative to a graphic content perspective of a luminance camera. The adjusting may comprise displacing a respective portion of the captured graphic content affected by the parallax by the amount of displacement.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
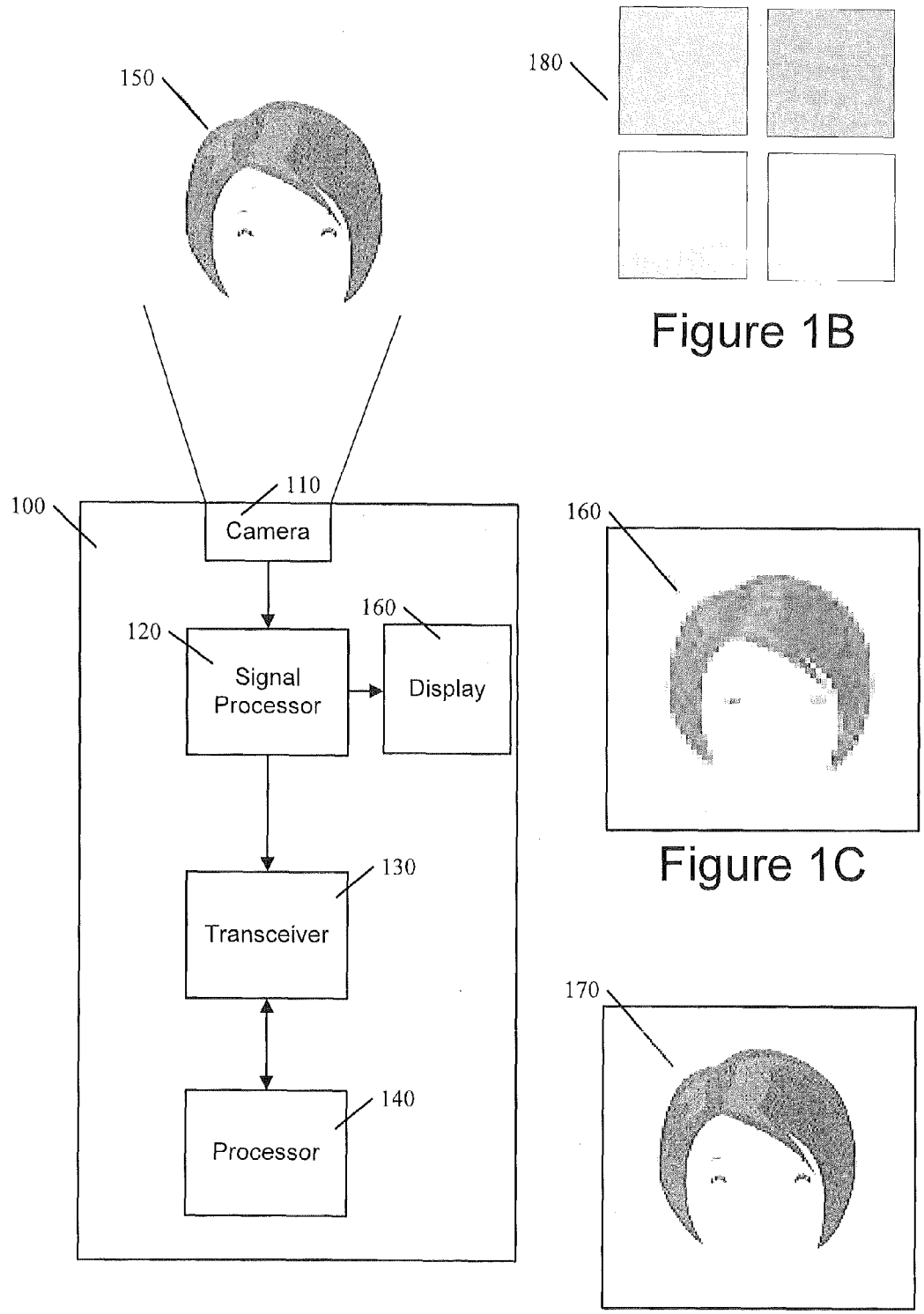
FIGS. 1A-1B illustrate an electronic device for capturing and correcting color fringes in an image, according to various embodiments of the present invention.
FIG. 1C illustrates a representation of an image having color fringes.
FIG. 1D illustrates a representation of a corrected image, according to various embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Array cameras have many advantages, but images may contain a parallax effect that can result in color mismatch. One traditional approach of parallax estimation through pixel correlation is determining the image displacement where the difference between individual pixel values is least.

The embodiments described below provide for a different approach to solving the parallax problem. Such embodiments are useful for video recording, including where the pixel resolution is relatively low compared to still image usage. Instead of applying a correlation algorithm, embodiments described herein identify the color fringes that are the result of parallax. Such color fringes can be easily detected and more easily adjusted for. Pixels with unnatural and disturbing colors are identified and corrected locally. Some embodiments of the present invention may thus be more computationally effective, as they may not perform a complete correlation and/or search for each pixel.

According to further embodiments, images from the multiple (for example, four) cameras may be aligned in such a way that objects at infinity distance and closest working distance result in the same amount of parallax in the image plane. For example, if an image at infinity distance has an offset of 0 pixels and an image at a closest distance to the camera array may have an offset of 6 pixels, splitting the offset between the two offsets at 3 pixels may help to speed along the error correction.

According to other embodiments, processes with a color space that separates color from luminance may be used. When producing the final image the luminance component is derived from just one camera having a green filter or no filter at all. The color (chroma) is derived from cameras having R, G and B filters.

As the human visual system is less sensitive to details in chroma than in luminance, it may be possible to more heavily filter the chroma channels without destroying the sharpness of the image. This filtering can reduce or eliminate residual color fringing. The fringing detection algorithm can take advantage of the fact that the distance between the cameras is known. Thus, if the algorithm detects a fringe caused by parallax between e.g. a green and a blue camera, the parallax between the green and the red as well as between the blue and the red can be calculated.

FIGS. 1A-1B illustrate an electronic device for identifying and correcting parallax errors in accordance with some embodiments of the present invention. The electronic device 100 may include a camera 110 that is configured to generate a visual data signal that includes content corresponding to an image 160 of an object 150, such as a person. Image 160 may represent a still image or an image or frame of a video stream. FIG. 1C illustrates a representation of an image having color fringes. FIG. 1D illustrates a representation of a corrected image, according to some embodiments.

Figure 2:
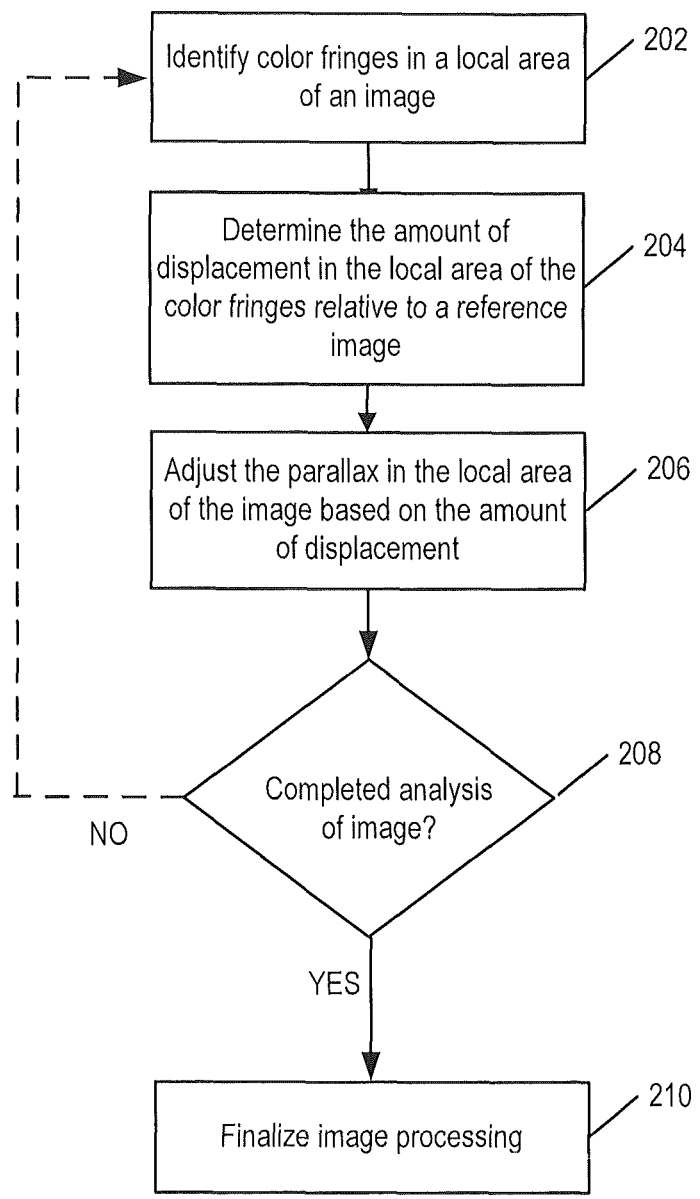
FIG. 2 is a flowchart illustrating a process for correcting color fringes in image data, according to various embodiments.

FIGS. 1A-1D will be discussed with reference to the flowchart of FIG. 2. A signal processor 120 may receive the visual data signal from the camera 110 and analyze the image 160. The image 160 may suffer from parallax errors and color fringes that result in a less distinct image. This parallax is a result of the different viewpoints of each of the cameras in the 2×2 array of cameras 180, as shown by FIG. 1B. Image 160, shown in FIG. 1C, appears to be blurrier and less distinct than the original object 150.

Analysis of image 160 may involve processing one or more portions or local areas of the image 160 at a time. Color fringes are identified in the local area(s) of the image 160 (block 202) where the offsets of respective images captured from different cameras of an array or matrix of cameras produce abnormal colors. In some embodiments, this may involve looking for abnormal colors in certain areas of a color space. The color space may include such color spaces such as CIE XYZ, YUV and their derivatives. Abnormal colors of a color fringe may be different than colors of image portions surrounding the fringe. The colors may also be different than expected. For example, abnormal colors may be a color or mix of colors caused by the portion of the image being displaced from the proper, reference or expected location in the image. The expected or reference location in the image may be defined or identified as the location in the image from a viewpoint of a camera indicated as a target or master camera.

Once color fringes have been identified, the displacement from the expected location may be measured (block 204). For example, if the color fringe indicates a displacement of 3 pixels, the image may be adjusted by the 3 pixels (block 206). The resulting image 170, as shown in FIG. 1D, may be clearer and more discernible. This form of correction based on the color abnormalities requires far less computation than some standard methods of pixel correlation. This process is repeated for each local area of the image. If the image has been completely analyzed (block 208), image processing is finalized (block 210). In various embodiments, adjustments may be provided on a local area by local area basis. In other embodiments, adjustments may be applied image wide once the displacement amount is determined after observing a certain number of local areas of the image 160.

According to some embodiments, residual mismatches may be resolved. This may include separating the luminance detector and determining the chrominance from the remaining color filters.

In some embodiments, identifying color fringes in a portion of an image or video includes sending the portion of the image to a processor that is operable to analyze the portion of the image. The electronic device 100 may include a transceiver 130 that may send the image 160 or a portion of the image 160 to another processor 140 that is configured to analyze the portion of the image for color fringes. The processor 140 may be internal to the electronic device 100 and the transceiver 130 may include an internal data transfer and/or data bus management function. As described herein, the signal processor 120 and/or the processor 140 may each be a general purpose processor and/or a digital signal processor, which may be enclosed in a common package or separate and apart from one another. In some embodiments, the processor 140 may be external to the electronic device and/or may be incorporated into a network and/or device that may be communicatively coupled to the electronic device 100 via the transceiver 130. The transceiver 130 may include a cellular transceiver that may include both a transmitter (TX) and a receiver (RX) to allow two way communications, but the present invention is not limited to such devices.

The above example refers to a camera having red (R), green (G) and blue (B) filters. The algorithm can, however, be tailored to handle various configurations of cameras for example a 2×2 array having a red, a green and a blue camera and a fourth camera without a color filter. In some cases, the filterless or "clear" camera is used for luminance while the three others are used for color recording. The embodiments are not restricted to a 2×2 array. Other configurations like a 1×3, RGB array may for instance be used.

For example, FIGS. 3A-3E show five examples of various camera configurations, according to various embodiments. The color filters of the cameras are identified. The clear cameras may lack filters and can be luminance cameras. For example, in FIG. 3A, camera 302A is the "master" camera and any color fringes would indicate displacement from the image expected from camera 302A. Camera 302A may be a filterless or luminance camera. Arrows 310A indicate that cameras 304A-308A are aligned to "master" camera 302A, which may serve as the viewpoint for the reference image.

Figure 3A:
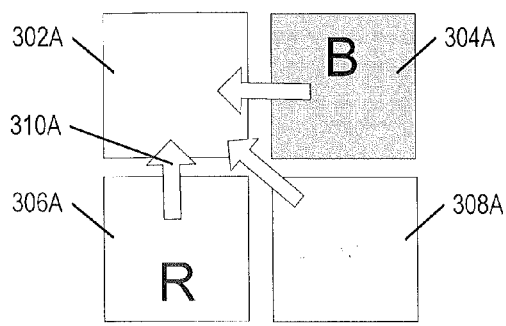
FIGS. 3A-3E illustrate examples of various camera configurations, according to various embodiments.
Figure 3B:
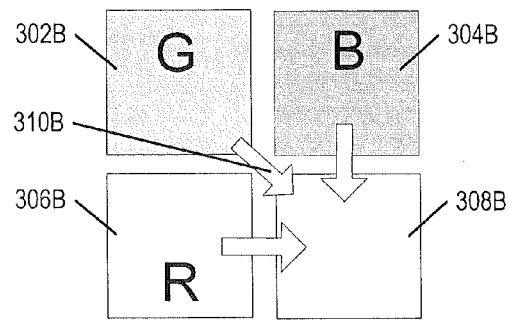
Figure 3C:
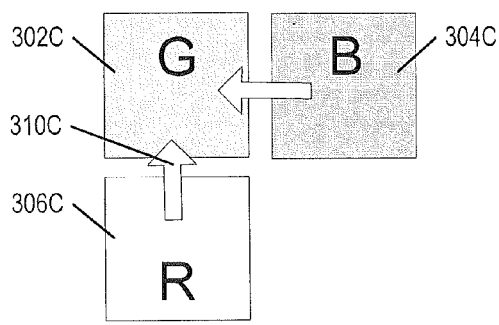
Figure 3D:
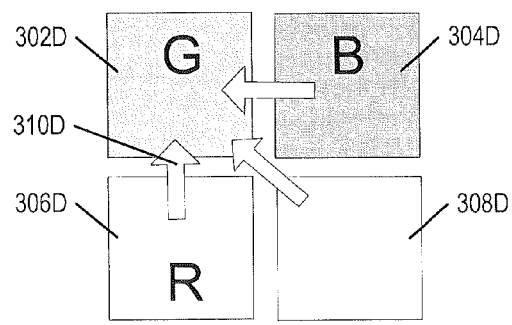
Figure 3E:
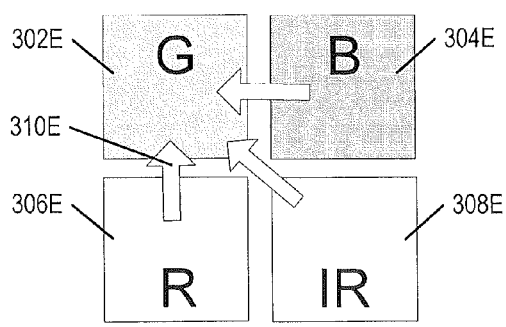

FIG. 3B shows a camera array 302B-308B with arrows 310B indicating that 308B is the master camera. In FIG. 3C, arrows 310C indicate that green filter camera 302C is the master camera for blue and red filter cameras 304C and 306C. In FIG. 3D, arrows 310D indicate that blue, red and filterless cameras 304D-308D use the viewpoint of camera 302D as the reference image. In FIG. 3E, the arrows 310E indicate that cameras 304E-308E are aligned to a camera 302E. Camera 308E may be an infra-red (IR) camera.

Figure 4:
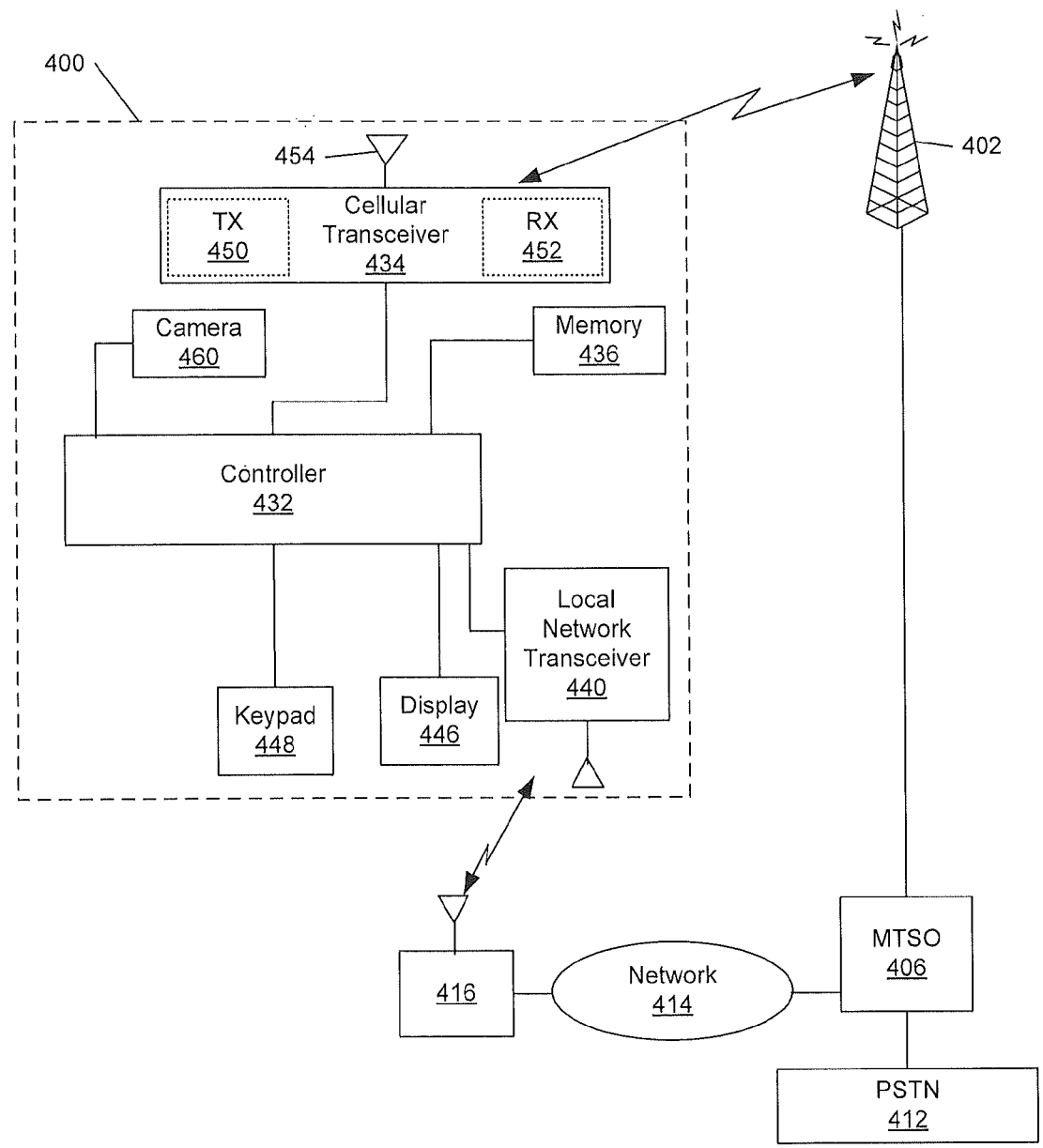
FIG. 4 is a schematic block diagram of a wireless communication system that includes a wireless terminal, according to various embodiments.

Reference is now made to FIG. 4, which is a schematic block diagram of a wireless communication system that includes a wireless terminal 400, according to various embodiments. The embodiments include reference to a mobile terminal but are not limited to a mobile terminal. The embodiments may also be used in other computing devices.

In some embodiments, the wireless terminal 400 may include a mobile wireless communications terminal that receives wireless communication signals from a cellular base station 402 and/or a wireless local network 416. The cellular base station 202 is connected to a MTSO 406, which, in turn, is connected to a PSTN 412, and a network 414 (e.g., Internet). The mobile terminal 400 may communicate with the wireless local network 416 using a communication protocol that may include, but is not limited to, 802.11a, 802.11b, 802.11e, 802.11g, 802.11i, and/or other wireless local area network protocols. The wireless local network 416 may be connected to the network 414.

In some embodiments of the invention, the mobile terminal 400 includes various components, such as a camera 460, a controller 432, a cellular transceiver 434, a memory 436, a local network transceiver 440, a display 446 and a keypad 448. Some embodiments provide that the display 446 may include a touch sensitive display or screen, or the like.

The memory 436 stores software that may be executed by the controller 432, and may include one or more erasable programmable read-only memories (EPROM or Flash EPROM), battery backed random access memory (RAM), magnetic, optical, or other digital storage device, and may be separate from, or at least partially within, the controller 432. The controller 432 may include more than one processor, such as, for example, a general purpose processor and a digital signal processor, which may be enclosed in a common package or separate and apart from one another. In particular, the controller 432 may be configured to control various functions of the wireless terminal 400, including receiving input from a touch sensitive screen or keypad 448.

As shown in FIG. 4, the cellular transceiver 434 typically includes both a transmitter (TX) 450 and a receiver (RX) 452 to allow two way communications, but the present invention is not limited to such devices and, as used herein, a "transceiver" may include only the receiver 452. The mobile terminal 400 may thereby communicate with the base station 402 using radio frequency signals, which may be communicated through an antenna 454. For example, the mobile terminal 400 may be configured to communicate via the cellular transceiver 434 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communication protocols as used herein may specify the information communicated, the timing, the frequency, the modulation, and/or the operations for setting-up and/or maintaining a communication connection. In some embodiments, the antenna 454 may be a single antenna.

It is to be understood that the present invention is not limited to the particular configurations shown in FIGS. 1A-1B, 1D and 2-4, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture may be implemented as a single processor system or a multi-processor system in accordance with various embodiments of the present invention.

The present invention may be embodied as methods, electronic devices, and/or computer program products. Some embodiments of the present invention were described above with reference to block diagrams and/or operational illustrations of methods and electronic devices. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations can be embodied on analog circuitry and/or digital circuitry. These program instructions may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a controller circuit to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, or semiconductor system, apparatus, or device. More specific examples (a non-exhaustive list) of the computer-readable medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Many different embodiments have been disclosed herein and different applications/variations will be apparent to a skilled person having knowledge of the present disclosure. In the drawings and specification, there have been disclosed typical embodiments of the invention and, although specific terms are employed, they are used in a generic and descriptive sense only and not for purposes of limitation, the scope of the invention being set forth in the following claims. It would be understood that it would be unduly repetitious and obfuscating to literally describe and illustrate every combination and subcombination of these embodiments. Accordingly, the present specification, including the drawings, shall be construed to constitute a complete written description of all combination and subcombinations of the embodiments of the present invention described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation.

What is claimed is:

1. An electronic device for reducing parallax in graphic content captured by a camera array including a plurality of distinct cameras with respective viewpoints that are different from each other, comprising:
    a processor; and
    a memory coupled to the processor and comprising computer readable program code embodied in the memory that when executed by the processor causes the processor to perform operations comprising:
        identifying a color fringe that corresponds to the parallax in the captured graphic content, the parallax being caused by a combination of images from respective cameras of the plurality of distinct cameras of the camera array, by identifying an abnormal color in the combination of images that is different from colors of image portions surrounding the color fringe in the combination of images;
        determining an amount of displacement of the color fringe relative to a reference image; and
        adjusting the parallax in the captured graphic content based on the amount of displacement,
    wherein the abnormal color in the combination of images is caused by the combination of the images from the respective cameras of the camera array as a result of the different respective viewpoints of the respective cameras.

2. The electronic device of claim 1, wherein the identifying, determining and adjusting are performed on ones of localized areas of the captured graphic content.

3. The electronic device of claim 1, wherein the abnormal color is different from an expected color for an area of the captured graphic content.

4. The electronic device of claim 1, wherein the determining comprises determining the amount of displacement based on an average of a displacement at a closest distance of an object to the camera array and a displacement at an infinite distance of an object from the camera array.

5. The electronic device of claim 1, wherein the adjusting is performed relative to a graphic content perspective of a camera of the camera array.

6. The electronic device of claim 5, wherein the adjusting is performed relative to a graphic content perspective of a luminance camera.

7. The electronic device of claim 1, wherein the adjusting the parallax comprises displacing a respective portion of the captured graphic content affected by the parallax by the amount of displacement.

8. A wireless terminal, comprising:
- a camera array comprising a plurality of distinct cameras with respective viewpoints that are different from each other, the camera array being configured to generate a visual data signal that corresponds to captured graphic content; and
- a signal processor configured to:
  - identify a color fringe in the visual data signal that corresponds to parallax in the captured graphic content that is caused by a combination of images from respective cameras of the plurality of distinct cameras of the camera array by identifying an abnormal color in the combination of images that is different from colors of image portions surrounding the color fringe in the combination of images;
  - determine an amount of displacement of the color fringe relative to a reference image; and
  - adjust the parallax in the graphic content based on, the amount of displacement,
- wherein the abnormal color in the combination of images is caused by the combination of the images from the respective cameras of the camera array as a result of the different respective viewpoints of the respective cameras.

9. The wireless terminal of claim 8, wherein the signal processor is further configured to adjust the parallax on ones of localized areas of the captured graphic content.

10. The wireless terminal of claim 8, wherein the abnormal color is different from an expected color for an area of the captured graphic content.

11. The wireless terminal of claim 8, wherein the signal processor is further configured to adjust the parallax relative to a graphic content perspective of a camera of the camera array.

12. The wireless terminal of claim 11, wherein the signal processor is further configured to adjust the parallax relative to a graphic content perspective of a luminance camera.

13. The wireless terminal of claim 8, wherein the signal processor is further configured to displace a respective portion of the captured graphic content affected by the parallax by the amount of displacement.

14. A method for reducing parallax in graphic content captured by a camera array including a plurality of distinct cameras with respective viewpoints that are different from each other, comprising:
- identifying a color fringe that corresponds to the parallax in the captured graphic content, the parallax being caused by a combination of images from respective cameras of the plurality of distinct cameras of the camera array, by identifying an abnormal color in the combination of images that is different from colors of image portions surrounding the color fringe in the combination of images;
- determining an amount of displacement of the color fringe relative to a reference image; and
- adjusting the parallax in the captured graphic content based on the amount of displacement,
- wherein the abnormal color in the combination of images is caused by the combination of the images from the respective cameras of the camera array as a result of the different respective viewpoints of the respective cameras.

15. The method of claim 14, wherein the identifying, determining and adjusting are performed on ones of localized areas of the captured graphic content.

16. The method of claim 14, wherein the abnormal color is different from an expected color for an area of the captured graphic content.

17. The method of claim 14, wherein the determining comprises determining an amount of displacement based on an average of a displacement at a closest distance of an object to the camera array and a displacement at an infinite distance of an object from the camera array.

18. The method of claim 14, wherein the adjusting is performed relative to a graphic content perspective of a camera of the camera array.

19. The method of claim 18, wherein the adjusting is performed relative to a graphic content perspective of a luminance camera.

20. The method of claim 14, wherein the adjusting the parallax comprises displacing a respective portion of the captured graphic content affected by the parallax by the amount of displacement.

* * * * *

UNITED STATES PATENT AND TRADEMARK OFFICE
CERTIFICATE OF CORRECTION

| | |
|---|---|
| PATENT NO. | : 9,762,875 B2 |
| APPLICATION NO. | : 13/961982 |
| DATED | : September 12, 2017 |
| INVENTOR(S) | : Gustavsson et al. |

It is certified that error appears in the above-identified patent and that said Letters Patent is hereby corrected as shown below:

In the Claims

Column 9, Claim 8, Line 31: Please correct "based on, the" to read -- based on the --

Signed and Sealed this
Thirteenth Day of March, 2018

Andrei Iancu
*Director of the United States Patent and Trademark Office*